US006898764B2

(12) United States Patent
Kemp

(10) Patent No.: US 6,898,764 B2
(45) Date of Patent: May 24, 2005

(54) METHOD, SYSTEM AND PROGRAM PRODUCT FOR DETERMINING DIFFERENCES BETWEEN AN EXISTING GRAPHICAL USER INTERFACE (GUI) MAPPING FILE AND A CURRENT GUI

(75) Inventor: Kirk O. Kemp, Erie, CO (US)

(73) Assignee: International Business Machines Corporation, Armonk, NY (US)

( * ) Notice: Subject to any disclaimer, the term of this patent is extended or adjusted under 35 U.S.C. 154(b) by 575 days.

(21) Appl. No.: 10/134,145

(22) Filed: Apr. 29, 2002

(65) Prior Publication Data

US 2003/0202012 A1 Oct. 30, 2003

(51) Int. Cl.[7] .............................. G06F 3/00; G06F 11/36
(52) U.S. Cl. ....................... 715/762; 715/764; 715/778; 717/170; 717/122
(58) Field of Search .................................. 715/762, 764, 715/778, 765, 966, 763, 866; 717/124, 126, 120, 122, 170, 168

(56) References Cited

U.S. PATENT DOCUMENTS

| | | | |
|---|---|---|---|
| 4,696,003 A | 9/1987 | Kerr et al. ..................... 371/19 |
| 4,845,665 A | 7/1989 | Heath et al. ................. 364/900 |
| 5,157,782 A | 10/1992 | Tuttle et al. ................. 395/575 |
| 5,233,611 A | 8/1993 | Triantafyllos et al. ..... 371/16.1 |
| 5,600,789 A | 2/1997 | Parker et al. .......... 395/183.14 |
| 5,673,387 A | 9/1997 | Chen et al. ............ 395/183.14 |
| 5,754,755 A | 5/1998 | Smith, Jr. .............. 395/183.14 |
| 5,781,720 A | 7/1998 | Parker et al. .......... 395/183.14 |
| 5,790,117 A | 8/1998 | Halviatti et al. ............ 345/333 |
| 5,790,829 A | 8/1998 | Flynn ......................... 395/500 |
| 5,805,899 A | 9/1998 | Evans et al. ................ 395/712 |
| 5,974,254 A * | 10/1999 | Hsu ........................ 717/122 X |
| 6,002,867 A | 12/1999 | Jazdzewski ................. 395/701 |
| 6,158,044 A | 12/2000 | Tibbetts ......................... 717/1 |
| 6,256,773 B1 | 7/2001 | Bowman-Amuah ............ 717/1 |
| 6,278,452 B1 * | 8/2001 | Huberman et al. ......... 715/764 |
| 6,332,211 B1 | 12/2001 | Pavela ........................... 717/2 |
| 6,698,013 B1 * | 2/2004 | Bertero et al. .......... 717/120 X |
| 6,769,114 B2 * | 7/2004 | Leung ......................... 717/124 |
| 2003/0221189 A1 * | 11/2003 | Birum et al. ................ 717/170 |

OTHER PUBLICATIONS

Andreas Zeller, "A Unified Version Model for Configuration Management", SIGSOFT, pp. 151–160, Dated: 1995.
Randy H. Katz, Toward a Unified Framework for Version Modeling in Engineering Databases, ACM Computing Surveys, vol. 22, No. 4, pp. 375–408, Dated: Dec. 1990.
Andreas Zeller, Unified Versioning Through Feature Logic, ACM Transactions on Software Engineering and Methodology, vol. 6, No. 4, pp. 398–441, Dated: Oct. 1997.
Andreas Zeller, "Smooth Operations with Square Operators—The Version Set Model in ICE", 2 pages, Dated: Mar. 1996. http://www.cs.tu–bs.de/softech/papers/tr–95–08.html.
Reidar Conradi and Bernhard Westfechtel, "Version Models for Software Configuration Management", ACM Computing Surveys, vol. 30, No. 2, pp. 232–282, Dated: Jun. 1998.
"About segue, companyprofile", http://www.segue.com/html/s_about/s_general.htn, 2 pages, Undated, Nov. 2001.

* cited by examiner

Primary Examiner—Raymond J. Bayerl
(74) Attorney, Agent, or Firm—John R. Pivnichny; Hoffman, Warnick & D'Alessandro

(57) ABSTRACT

A method, system and program product for determining differences between an existing graphical user interface (GUI) mapping file and a current GUI is provided. Specifically, under the present invention, a first list of objects based on an existing GUI mapping file (i.e., pertaining to a previous version of a software program) is recursively generated. A second list of objects based on a current GUI (i.e., pertaining to a current version of a software program) is also recursively generated. The two lists are then compared to determine if any GUI objects have been changed (added or removed) between the previous and current versions of the software program.

5 Claims, 4 Drawing Sheets

US 6,898,764 B2

METHOD, SYSTEM AND PROGRAM PRODUCT FOR DETERMINING DIFFERENCES BETWEEN AN EXISTING GRAPHICAL USER INTERFACE (GUI) MAPPING FILE AND A CURRENT GUI

BACKGROUND OF THE INVENTION

1. Field of the Invention

The present invention generally relates to a method, system and program product for determining differences between an existing GUI mapping file and a current GUI. More particularly, the present invention enhances GUI object testing by automatically determining the GUI objects that have changed between versions of a software program.

2. Background Art

A significant part of the development cycle in any software program is the testing cycle. Testing is necessary to ensure that the program functions correctly. For many programs, part of the testing cycle includes graphical user interface (GUI) object testing. GUI objects are the icons, push buttons, drop down menus, etc. that a user of the program will manipulate to utilize the program. Since the GUI objects play an important role in a program's functionality, it is often desirable to test the objects themselves. In general, GUI object testing helps ensure, among other things: (1) all GUI objects are present; (2) the GUI objects are in the correct functional form; (3) the GUI objects have the correct default settings and associated text (if any); and (4) the GUI objects function properly.

GUI object testing is typically implemented via testing tools such as GUI capture play back testing tools. To facilitate the automation of GUI test cases, the testing tools commonly create various forms of GUI mapping files that are used to describe the contents of the program's GUI at an object level. Specifically, a GUI mapping file generally includes one line of text for each GUI object, with each line describing a particular GUI object. Unfortunately, GUI mapping files are extremely difficult to maintain. That is, a program's GUI often experiences significant change from one version or build to the next. It is essential for the build and test teams of the program to be informed of any such changes for proper testing. Failure of the teams to be so informed can waste valuable time during testing.

Currently, changes to the GUI from one version of a program to the next are manually identified. Not only is manual identification time-consuming, but it is also costly. This is especially the case since a GUI typically includes a hierarchy of parent-child objects.

In view of the foregoing, there exists a need for a method, system and program product for determining differences between an existing GUI mapping file and a current GUI. Specifically, a need exists for way to determine the GUI object differences between a previous version of a program and current version of the program. A further need exists to recursively determine such differences so that both parent and child object differences can be determined.

SUMMARY OF THE INVENTION

The present invention generally relates to a method, system and program product for determining differences between an existing graphical user interface (GUI) mapping file and a current GUI. Specifically, a first list of GUI objects based on an existing GUI mapping file (i.e., a mapping file that is based on a previous/already existing version of a program) is recursively generated. A second list of objects based on a current GUI (the GUI of the current version of the same program) is also recursively generated. Under recursive generation, all hierarchical levels of GUI objects are added to the lists. Once both lists have been completed, they will be compared to each other to identify any differences between the existing GUI mapping file and the current GUI. Specifically, any GUI object that is in the first list, but not the second has been removed from the current program version. Moreover, any GUI object that is in the second list, but not the first list (i.e., has a tag in a dynamic form) has been added to the current program version (is new). In either event, an appropriate message will be displayed for the build and/or test teams.

According to a first aspect of the present invention, a method for determining differences between an existing graphical user interface (GUI) mapping file and a current GUI is provided. The method comprises: (1) recursively constructing a first list of GUI objects based on the existing GUI mapping file; (2) recursively constructing a second list GUI objects based on the current GUI; and (3) determining differences between the existing GUI mapping file and the current GUI by comparing the first list to the second list.

According to a second aspect of the present invention, a method for determining differences between an existing graphical user interface (GUI) mapping file and a current GUI is provided. The method comprises: (1) constructing a first list of all parent objects from the existing GUI mapping file and recursively adding thereto all child objects from the existing GUI mapping file; (2) constructing a second list of all parent objects from the current GUI and recursively adding thereto all child objects from the current GUI; (3) displaying a first message for each of the objects in the first list not found in the second list; and (4) displaying a second message for each of the objects in the second list having a tag in a dynamic format.

According to a third aspect of the present invention, a system for determining differences between an existing graphical user interface (GUI) mapping file and a current GUI is provided. The system comprises: (1) a file system for recursively constructing a first list of objects based on the existing GUI mapping file; (2) a GUI system for recursively constructing a second list objects based on the current GUI; and (3) a comparison system for determining differences between the existing GUI mapping file and the current GUI by comparing the first list to the second list.

According to a fourth aspect of the present invention, a program product stored on a recordable medium for determining differences between an existing graphical user interface (GUI) mapping file and a current GUI is provided. When executed, the program product comprises: (1) program code for recursively constructing a first list of objects based on the existing GUI mapping file; (2) program code for recursively constructing a second list of objects based on the current GUI; and (3) program code for determining differences between the existing GUI mapping file and the current GUI by comparing the first list to the second list.

Therefore, the present invention provides a method, system and program product for determining differences between an existing GUI mapping file and a current GUI.

BRIEF DESCRIPTION OF THE DRAWINGS

These and other features of this invention will be more readily understood from the following detailed description of the various aspects of the invention taken in conjunction with the accompanying drawings in which.

Figure 1:
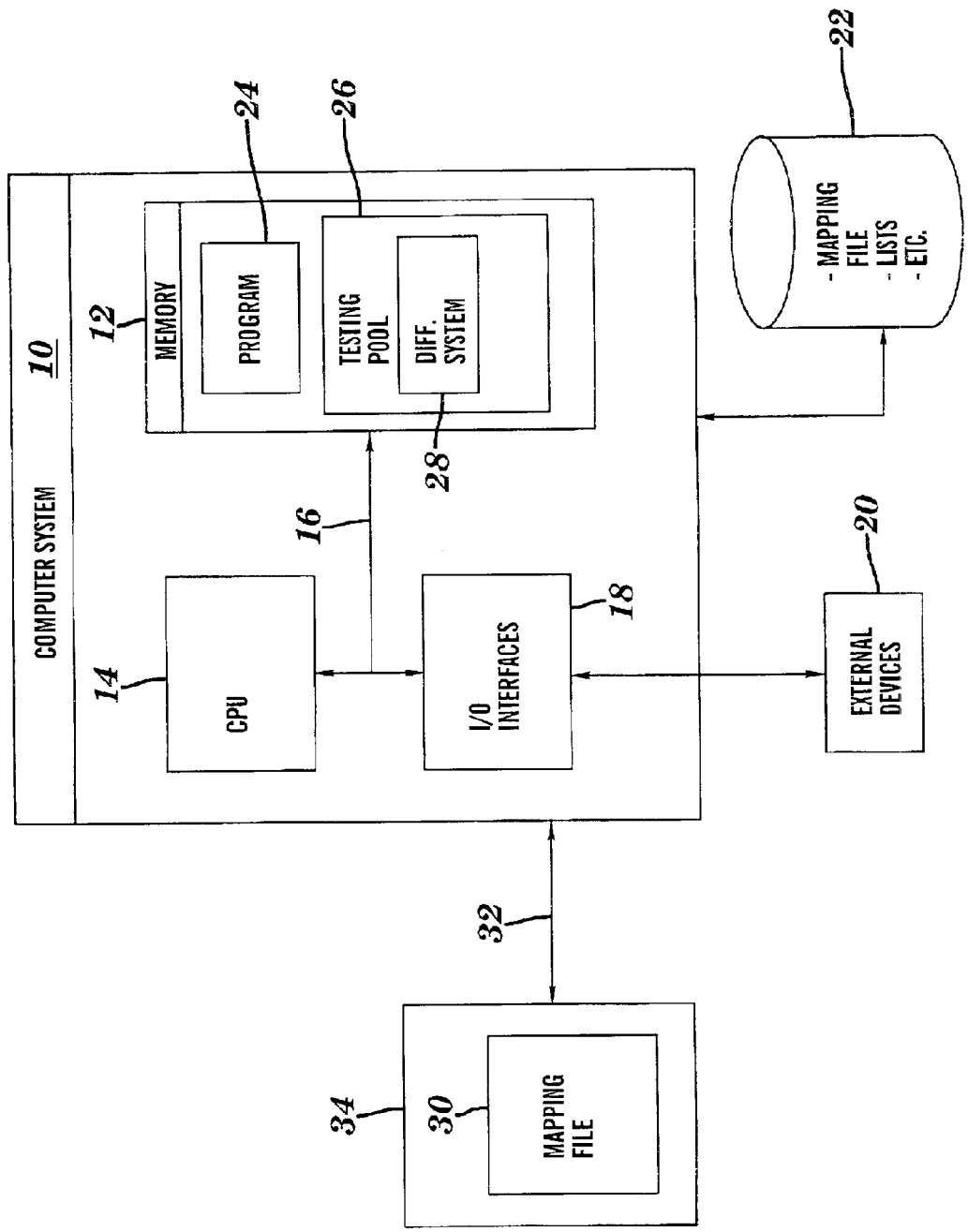
FIG. 1 depicts a computer system having a differential system according to the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

In general, the present invention provides a method, system and program product for determining differences between an existing graphical user interface (GUI) mapping file and a current GUI. Specifically, the present invention ascertains changes (i.e., removal or addition) in GUI objects from one version of a software program to another. As used herein, a GUI object is intended to mean any visible interface means such as a button, menu, icon, or the like that is present in a GUI for controlling the underlying software program. A user of the program will typically manipulate the GUI objects using a mouse or other input device.

Referring now to FIG. 1, a computerized implementation of the present invention is shown. As shown, computer system 10 generally comprises memory 12, central processing unit (CPU) 14, bus 16, input/output (I/O) interfaces 18, external devices/resources 20 and database 22. Memory 12 may comprise any known type of data storage and/or transmission media, including magnetic media, optical media, random access memory (RAM), read-only memory (ROM), a data cache, a data object, etc. Moreover, memory 12 may reside at a single physical location, comprising one or more types of data storage, or be distributed across a plurality of physical systems in various forms. Likewise, CPU 14 may comprise a single processing unit, or be distributed across one or more processing units in one or more locations, e.g., on a client and server.

I/O interfaces 18 may comprise any system for exchanging information to/from an external source. External devices/resources 20 may comprise any known type of external device, including speakers, a CRT, LED screen, hand-held device, keyboard, mouse, voice recognition system, speech output system, printer, monitor, facsimile, pager, etc. Bus 18 provides a communication link between each of the components in computer system 10 and likewise may comprise any known type of transmission link, including electrical, optical, wireless, etc. In addition, although not shown, additional components, such as cache memory, communication systems, system software, etc., maybe incorporated into computer system 10.

Database 22 may provide storage for information necessary to carry out the present invention such as GUI mapping files, lists, etc. As such, database 22 may include one or more storage devices, such as a magnetic disk drive or an optical disk drive. In another embodiment, database 22 includes data distributed across, for example, a local area network (LAN), wide area network (WAN) or a storage area network (SAN) (not shown). Database 22 may also be configured in such a way that one of ordinary skill in the art may interpret it to include one or more storage devices.

Communication with computer system 10 occurs via communications link 32. Communications link 32 is intended to represent any possible method of communicating with computer system 10. For example tester 34 and computer system 10 can communicate via a direct hardwired connection (e.g., serial port), or via an addressable connection (e.g., remotely) in a client-server environment. In the case of the latter, the server and client may be connected via the Internet, wide area networks (WAN), local area networks (LAN) or other private networks. The server and client may utilize conventional network connectivity, such as Token Ring, Ethernet, or other conventional communications standards. Where the client communicates with the server via the Internet, connectivity could be provided by conventional TCP/IP sockets-based protocol. In this instance, the client would utilize an Internet service provider to establish connectivity to the server.

Stored in memory 12 are software program 24 and testing tool 26. In general, testing tool 26 is utilized to test software program 24, which can be any software program such as an application, operating system, etc. As indicated above, testing of software program 24 typically includes GUI object testing. That is, the GUI objects implemented in software program 24 should be tested to ensure that, among other things: (1) all GUI objects are present; (2) the GUI objects are in the correct functional form; (3) the GUI objects have the correct default settings and associated text (if any); and (4) the GUI objects function properly. In successfully testing GUI objects, tester 34 must know exactly what GUI objects are present in software program 24. This is especially important since GUI objects can routinely change (i.e., be added or removed) from one version of software program 24 to the next. Under previous systems, changes to the GUI objects were manually identified, which is a time-consuming and expensive process. The present invention, automates the process by comparing GUI objects from an existing GUI mapping file 30 (i.e., a mapping file generated based on a previous version of software program 24) to GUT objects from a current GUI (i.e., a GUI of the current version of software program 24 being tested). To this extent, testing tool 26 includes differential system 28.

As indicated above, GUI mapping files are typically generated by testing tool 26 during testing of a software program. In general, GUI mapping files provide a snapshot of a GUI. That is, GUI mapping files are used to describe the contents of a program's GUI at an object level. To this extent, GUI mapping files typically include one line of text for each GUI object in the program, with each line describing a particular object. Under the present invention, GUI mapping file 30 is based on a previous version of software program 24. Specifically, GUI mapping file 30 was generated by testing tool 26 during testing of the previous version of software program 24. Thus, GUI mapping file 30 already exists when the current version of software product 24 is being tested as depicted in FIG. 1. To this extent, GUI mapping file 30 can be provided for processing under the present invention by tester 34 and stored in database 22 (if not already stored). It should be appreciated, however, that the manner in which GUI mapping file 30 is provided is not intended to be limiting, and any alternative can be implemented. For example, GUI mapping file 30 could be provided on a recordable medium and loaded into memory 12. In any event, once GUI mapping file 30 has been provided, differential system 28 will determine the differences (if any) between GUI mapping file 30 and the current GUI.

Figure 2:
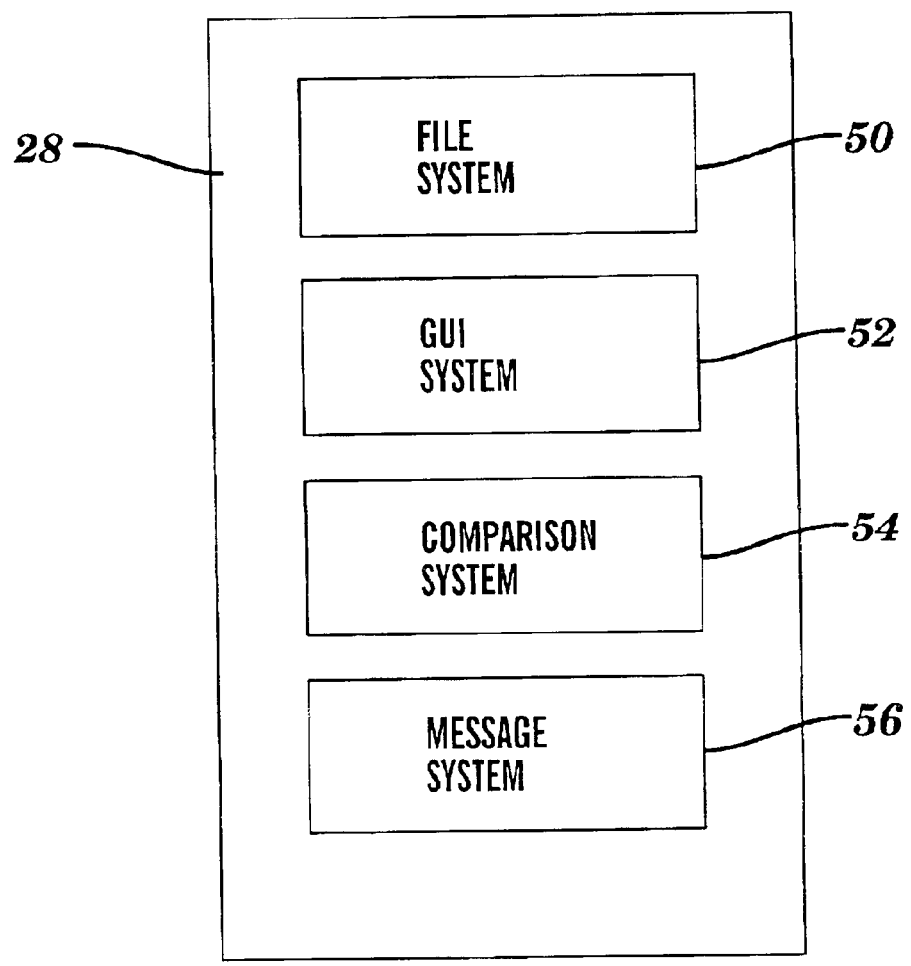
FIG. 2 depicts the differential system of FIG. 1.

Referring now to FIG. 2, a more detailed depiction of differential system 28 is shown. As depicted, differential system 28 includes file system 50, GUI system 52, comparison system 54 and message system 56. File system 50 will access GUI mapping file 30 and recursively generate a "file" list of all GUI objects based thereon. Specifically, file system will recursively generate a list of all parent objects and child objects identified in GUI mapping file 30. As indicated above, GUI mapping file 30 includes a one line description (known as a tag) for each object present in the GUI of the previous version of software program 24. Thus, the one line format of the tags is known as a non-dynamic format.

In recursively generating the file list, file system 50 will search GUI mapping file 30 to identify all parent objects. Once identified, all parent objects and/or their corresponding tags will be placed in the file list. Then, file system 50 will return to GUI mapping file 30 and continue to call the parent objects until their child objects are identified. Once identified, the child objects and/or their corresponding tags are added to the file list. This can continue for "N" hierarchical levels of GUI objects. For example, file system 50 can then return to GUI mapping file 30 to identify child objects of the child objects for addition to the file list. In the end, the file list will include/identify all GUI objects identified in existing GUI mapping file 30.

Figure 3:
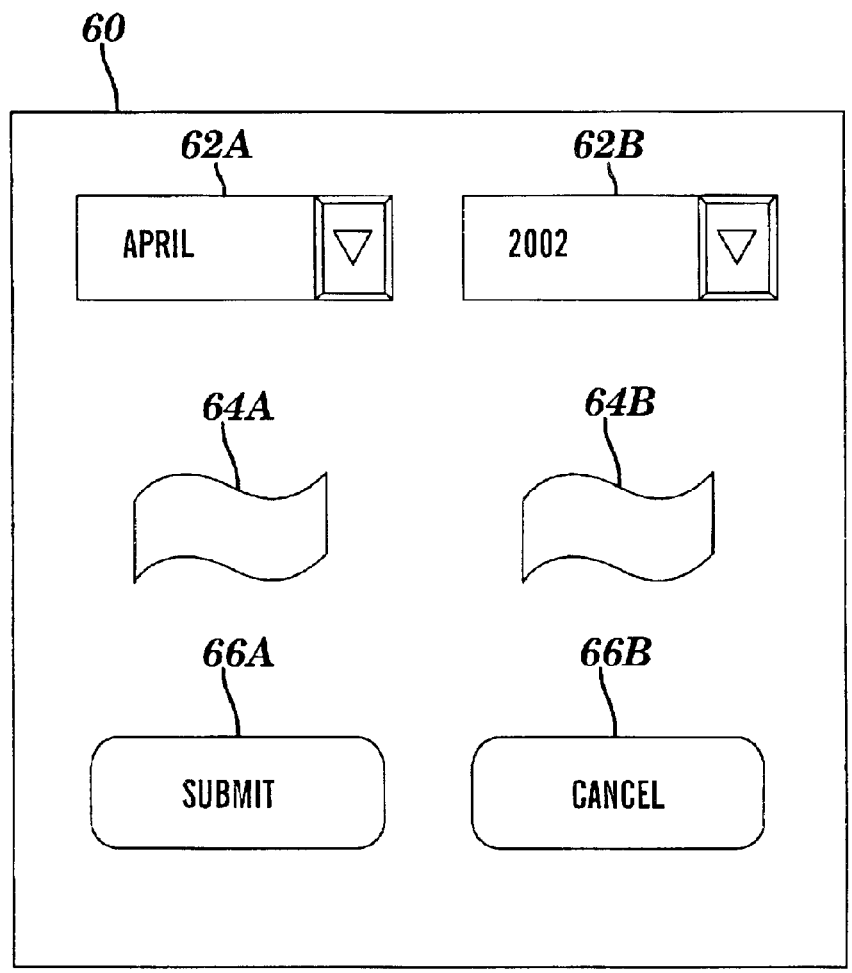
FIG. 3 depicts an exemplary graphical user interface (GUI).

Once the file list has been completed, GUI system 52 will access the actual GUI of the current version of software program 24, and similarly generate a "GUI" list. Specifically, GUI system will recursively generate a list that identifies all GUI objects present in the current GUI. Referring to FIG. 3, an exemplary GUI 60 is shown. As depicted, GUI 60 includes GUI objects 62A–B, 64A–B and 66A–B. Such objects can include, among other things, drop-down menus 62A–B, icons 64A–B and buttons 66A–B. Moreover, as can be the case with any version of software program 24, some objects can be child objects of other objects. For example, icon 64B could be a child of icon 64A.

Referring back to FIG. 2, GUI system 52 will recursively access GUI 60 to identify all objects therein, and place such objects and/or their associated tags in the GUI list. However, GUI objects that are new will not be present in any GUI mapping file and will not have tags. In such a case, GUI system 52 will generate a tag in a "dynamic" format for each such object. That is, each tag will include all necessary information about a particular GUI object, but may not be in the "one line" GUI mapping file 30 (non-dynamic) format. Conversely, any GUI object that is unchanged (i.e., was in both the previous version and the current version) will have a tag available in a non-dynamic format via GUI mapping file 30.

Similar to generation of the file list, recursive generation of the GUI list involves repeatedly querying GUI 60 to identify and add all parent objects and child objects (e.g., including child objects of child objects) to the GUI list. In the end, the GUI list will include/identify all GUI objects present in current GUI 60.

Once both lists have been generated, a clear depiction of all GUI objects in both existing GUI mapping file 30 and current GUI 60 is established. Since GUI mapping file 30 is based on a previous version of software program 24, and the current GUI is directly from the current version of software program 24, a comparison of the two lists will allow any GUI object differences/changes between the two versions to be determined. Such a comparison is performed via comparison system 54. In making the comparison, any GUI objects that are in the file list, but are not found in the GUI list are deemed to have been removed from software program 24 (i.e., were present in the previous version of software program 24, but not in the current version). Conversely, any GUI objects that are in the GUI list, but are not found in the file list are considered to be new or added to software program 24 (i.e., were not in the previous version, but are now in the current version). Moreover, since all new GUI objects will have a tag in a dynamic format in the GUI list, any GUI object having a tag in a dynamic format will be considered to be new.

Once all changes to the GUI objects have been determined, message system 56 will display any necessary messages. Specifically, tester 34 (FIG. 1) should be informed of all object changes from the previous version to the current version of software program 24 so that testing may be efficiently performed. In a typical embodiment, each GUI object that has been removed (i.e., was in the file list but not in the GUI list), will have a message similar to: "item does not exist in the current build of the product under test." Conversely, any GUI objects that have been added (i.e., was in the GUI list but not in the file list, or has a tag in a non-dynamic format) will have a message similar to: "item is new to the GUI."

Figure 4:
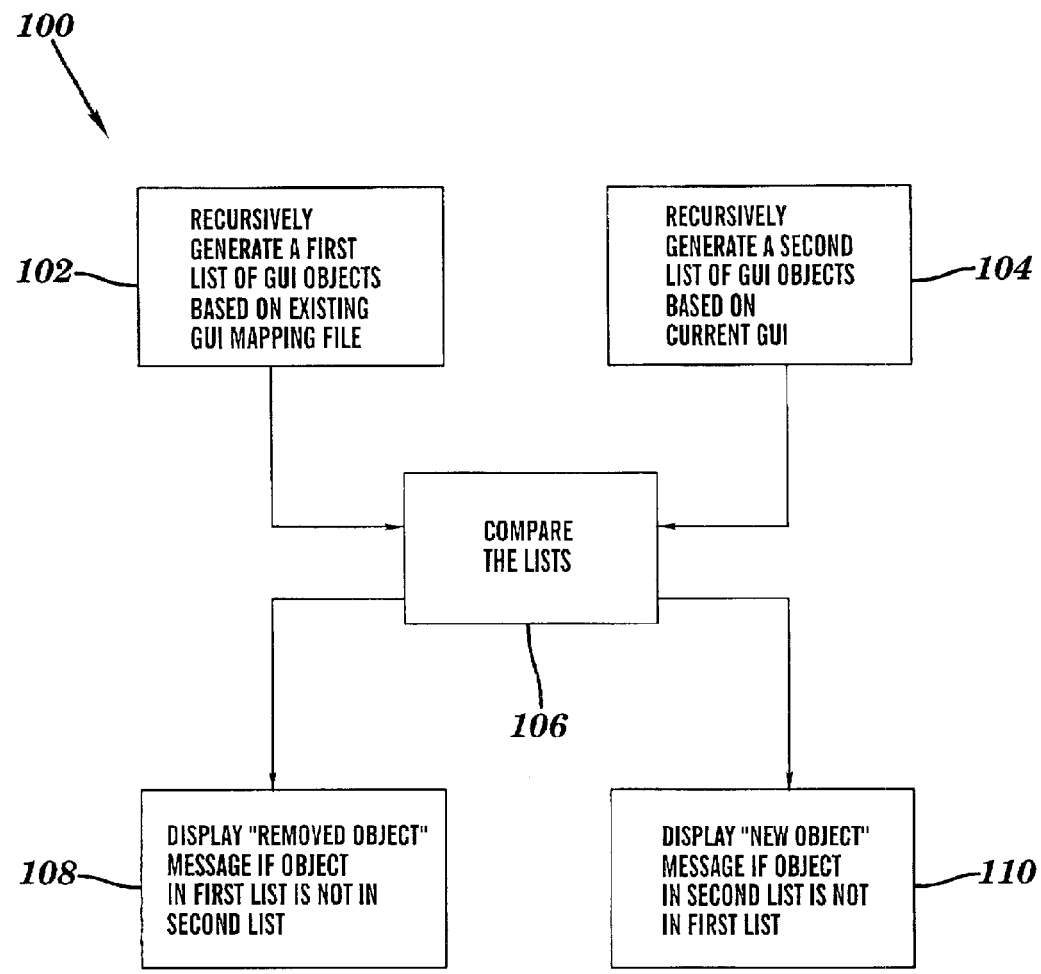
FIG. 4 depicts a method flow diagram according to the present invention.

Referring now to FIG. 4, a method flow 100 diagram according to the present invention is shown. As shown, first step 102 involves recursively generating a first list of objects based on an existing GUI mapping file. As indicated above, recursive generation involves repeatedly calling all GUI objects so that all parent and child objects can be added to the list. Child objects are typically identified by calling their respective parent objects. A second list based on the current GUI will then be recursively generated in a similar manner 104. Once both lists have been generated, they will be compared in step 106 to determine any differences between the existing GUI mapping file and the current GUI. That is, the comparison step 106 will determine whether the GUI objects have changed from the previous version of the software program to the current version. As indicated above, a GUI object has been removed if it is in the first list but not in the second list. Conversely, a GUI object has been added if it has a tag in a dynamic format, or appears in the second list but not in the first list. For each GUI object that has been removed from the current version, a removal message will be displayed 108. For each object that has been added, an addition message will be displayed 110.

It should be understood that the list generated based on GUI mapping file 30 is referred to as the "first" list, and the list generated based on GUI 60 as the "second" list for exemplary purposes only. The lists can actually be generated and referred to in any order. It should also be understood that the present invention can be realized in hardware, software, or a combination of hardware and software. Any kind of computer/server system(s)—or other apparatus adapted for carrying out the methods described herein—is suited. A typical combination of hardware and software could be a general purpose computer system with a computer program that, when loaded and executed, controls computer system 10 such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims. For example, although the tags for added (new) GUI objects have been described herein as being generated by GUI system 52 (FIG. 2), any system (e.g., comparison system 54) could actually generate the tags.

What is claimed is:

1. A method for determining differences between an existing graphical user interface (GUI) mapping file and a current GUI, comprising:

constructing a first list of all parent objects from the existing GUI mapping file and recursively adding thereto all child objects from the existing GUI mapping file;

constructing a second list of all parent objects from the current GUI and recursively adding thereto all child objects from the current GUI;

displaying a first message for each of the objects in the first list not found in the second list; and displaying a second message for each of the objects in the second list having a tag in a dynamic format.

2. The method of claim 1, further comprising comparing the first list to the second list to determine differences between the existing GUI mapping file and the current GUI.

3. The method of claim 1, wherein each of the objects in the first list has a tag in a non-dynamic format.

4. The method of claim 1, wherein each of the objects in the second list having a tag in a dynamic format is not found in the first list.

5. The method of claim 1, wherein the existing GUI mapping file pertains to a previous version of a program, and wherein the current GUI pertains to a current version of the program.

* * * * *